(12) United States Patent
Kinno

(10) Patent No.: US 6,773,628 B2
(45) Date of Patent: Aug. 10, 2004

(54) LIQUEFIED COLOR PHOSPHORESCENT MATERIAL AND METHOD THEREOF

(75) Inventor: Takashi Kinno, Tokyo (JP)

(73) Assignee: Turn On Co., Ltd., Kanagawa (JP)

(*) Notice: Subject to any disclaimer, the term of this patent is extended or adjusted under 35 U.S.C. 154(b) by 0 days.

(21) Appl. No.: 10/201,006

(22) Filed: Jul. 23, 2002

(65) Prior Publication Data

US 2003/0052307 A1 Mar. 20, 2003

(30) Foreign Application Priority Data

Jul. 27, 2001 (JP) ......................................... 2001-227787

(51) Int. Cl.[7] ............................................. C09K 11/02
(52) U.S. Cl. ................................................. 252/301.36
(58) Field of Search ....................... 252/301.36; 728/670

(56) References Cited

U.S. PATENT DOCUMENTS

| 3,294,699 A | * | 12/1966 | Lange | ................. | 252/301.4 R |
| 4,837,481 A | * | 6/1989 | Verstegen et al. | .......... | 313/486 |
| 5,376,303 A | * | 12/1994 | Royce et al. | ......... | 252/301.4 R |

FOREIGN PATENT DOCUMENTS

| EP | 0525211 | | 2/1992 |
| EP | 1090974 | | 4/2001 |
| EP | 1074599 | | 7/2001 |
| JP | 58-034887 | | 3/1983 |
| JP | 03-166269 | * | 7/1991 |
| JP | 05059297 | | 8/1991 |
| JP | 05059318 | | 3/1993 |
| JP | 11158420 | | 11/1997 |
| JP | 10036834 | | 2/1998 |
| JP | 11-130992 | | 5/1999 |
| JP | 11158420 | | 6/1999 |
| JP | 11-158420 | * | 6/1999 |
| JP | 2000-107681 | * | 4/2000 |
| JP | 2000-109730 | * | 4/2000 |

* cited by examiner

Primary Examiner—C. Melissa Koslow
(74) Attorney, Agent, or Firm—King & Schickli, PLLC

(57) ABSTRACT

A liquefied color phosphorescent material consisting of a mixture which comprises a stock solution; a colorant; a color-emitting phosphorescent fine pigment particle having an average particle diameter of 7 μm or less; and an additive for stably dispersing pigments containing a cellulose-based synthetic resin, silica-based powder, cyclohexanone, isophorone and mineral spirit. The pigment particles of colorant and the color-emitting phosphorescent fine pigment particle are enabled to be always maintained in a substantially uniform dispersion state in the stock solution, thereby making it possible to attain a desired emitting color and to coat the phosphorescent material without necessitating the undercoating using a color paint.

15 Claims, 3 Drawing Sheets

LIQUEFIED COLOR PHOSPHORESCENT MATERIAL AND METHOD THEREOF

TECHNICAL FIELD

The present invention relates to a phosphorescent material which is capable of emitting light in the darkness when it is irradiated with light, and in particular, to a liquefied color phosphorescent material which is capable of always maintaining a three-dimensionally uniform dispersion state of pigment particles and phosphorescent particles in the phosphorescent material, thereby making it possible to control the color tone of emitting light (the adjustment of color tone and the resolution of color) and also to control the color tone of colorant which is visual under a lighted condition such as daylight.

BACKGROUND OF THE INVENTION

It has been conventionally known that when the phosphorescent paint is excited by the irradiation of sun light, ultraviolet rays, electric light, etc., the energy thereof is accumulated in the phosphorescent paint and the energy thus accumulated is subsequently gradually converted into light after the suspension of the irradiation of light, thereby emitting light. Since this phosphorescent paint is capable of emitting light in the darkness, this phosphorescent paint has been practically employed in the fabrication of the face of watch, various marks, etc. In recent years, this phosphorescent paint has been utilized even in so-called fashion goods such as shoes, and there is an increasing demand for such phosphorescent paint.

Under these circumstances, the phosphorescent paint is now demanded to have various characteristics, i.e. it can be easily coated irrespective of the kinds of object to be coated, the fluorescence to be emitted is uniform, and the coated surface to be obtained is smooth. Among various kinds of the phosphorescent paint, the paint whose end-use as well as utilization are expected to be expanded in future, if realized, would be the one which is capable of emitting a light of desired color (for example, a phosphorescent paint which is capable of emitting a red color, or a blue color).

Further, if it is possible to realize a phosphorescent material wherein the color tone which is visual under a lighted condition such as daylight (hereinafter referred to as under visual condition) differs from the color of emitting light in the darkness, or a phosphorescent material which is capable of delicately controlling the color of emitting light to a desired color, the end-use of the phosphorescent material can be further expanded, and hence the industrial utility thereof can be further promoted.

The luminescent color to be emitted in the darkness from the phosphorescent paint according to the prior art is limited to a light green color irrespective of the kinds of color under visual condition. Under the circumstances, various renovations of phosphorescent paint have been attempted with a view to develop a phosphorescent paint which is capable of emitting different kinds of luminescent color.

In this respect, there is suggested an idea as seen for example in Japanese Patent Registration No. 2866123 (Unexamined Pub. No. H03-166269) and Japanese Patent Unexamined Publication H11-158420, wherein the addition of fluorescent paints or organic pigments to a phosphorescent paint is suggested.

However, even if it is possible prevent the generation of color skipping of color tone under visual condition by the addition of fluorescent paints or organic pigments to a phosphorescent paint, the luminescent color to be emitted therefrom is still light green. Even if it may be possible to alter the luminescent color more or less, the range of alteration of the luminescent color is extremely limited (see Japanese Patent Unexamined Publication H11-158420, paragraph [0014]). Namely, it is far from possible to obtain a desired luminescent color.

On the other hand, phosphorescent color paints for obtaining various kinds of luminescent color is also suggested. These phosphorescent color paints according to the prior art are formed of a mixture comprising a color pigment, a phosphorescent agent and an anti-sediment agent.

However, as shown in FIG. 6, these conventional phosphorescent paints are defective in that when these phosphorescent paints are applied for example by means of brushing or wiping, the phosphorescent agent 2 thereof is allowed to sediment with time and to settle on the underlying substrate 3 due to a relatively large specific gravity of the phosphorescent agent 2, resulting in that the layer of the phosphorescent agent 2 thus settled is ultimately covered by the color pigment 1. Namely, the employment of only the conventional anti-sediment agent is substantially ineffective in preventing the sedimentation of the phosphorescent agent 2.

As a result, light or ultraviolet ray is shut out by the color pigment 1, thereby preventing the light or ultraviolet ray from being sufficiently absorbed by the phosphorescent agent 2. Accordingly, these phosphorescent paints are accompanied with drawbacks in that it is difficult to secure a constant luminescence, that the luminous intensity is poor or becomes substantially zero if the color pigment 1 is coated thickly, and that the surface of coating thereof is poor in smoothness.

Further, since it is impossible to secure constant luminescence and luminous intensity, if these phosphorescent paints are desired to be coated on a colored or patterned surface of substrate, a white paint is required to be primed in advance on this colored or patterned surface of substrate prior to the coating of these phosphorescent paints. As a result, the applicability of these phosphorescent paints and sheets is caused to be limited.

Under the circumstances, various kinds of invention are suggested as seen from Japanese Patent Unexamined Publication 2000-109730; and Japanese Patent Unexamined Publication 2000-107681, wherein phosphorescent particles are mixed with a transparent clear paint so to mainly improve the luminous intensity on the occasion of emission and also improve the luminescence time.

However, it is impossible, even with these inventions, to realize a luminescence of desired color. The main feature of these inventions resides in that through the emission of the transparent clear paint layer (actually, translucent), the color of the underlying layer disposed below the clear paint layer is utilized as a luminescent color. However, since the layer giving the emission of light is confined to the translucent paint layer, the color of the underlying layer will be simply recognized as a monotone, so that even if it is possible to obtain a constant luminous intensity, it is impossible to make it visualize as the color aimed at. Namely, it is almost impossible even with the aforementioned inventions to obtain a luminescent color as desired.

Additionally, it is required, according to these inventions, to spray a phosphorescent paint to a uniform thickness by making use of a special machine (see paragraph [0009] of Japanese Patent Unexamined Publication 2000-109730 and paragraph [0009] of Japanese Patent Unexamined Publication 2000-107681). Namely, unless this special machine is employed, it is impossible to perform the painting. Moreover, since a thinner is employed in these inventions, it would be difficult to apply the phosphorescent paints of these inventions to plastic chips or to textile products. Namely, the phosphorescent paints of these inventions cannot be freely coated, and the objects to which this coating would be applicable may be restricted.

On the other hand, the particle size of phosphorescent pigments employed in the conventional phosphorescent materials is not uniform. As a result, due to the effects of friction by the non-uniform phosphorescent particles or of hardness of the non-uniform phosphorescent particles, there have been much possibilities to damage or destroy the working equipments, machine or machine components in each of working processes using the non-uniform phosphorescent material. Moreover, the employment of the non-uniform phosphorescent particles leads to various troubles in the printing process thereof that unless a screen printing plate of large mesh is employed, the clogging or damaging of the screen printing plate would be caused to occur, and that due to the friction of phosphorescent pigment particles on the occasion of printing thereof, heat is caused to generate to thereby dry the ink. As a result, automation apparatuses, machines or machine members useful for the conventional phosphorescent material are limited because of the aforementioned reasons.

In the case of phosphorescent materials where the usefulness thereof is based on the diffusion and dispersion thereof in the surface layer of coating, the effects of phosphorescent emission as well as the effects of color under visual condition that may be brought about by the effects of dispersion of phosphorescent materials cannot be fully attained unless the phosphorescent materials are coated to a predetermined thickness or more. Therefore, it has been impossible to print the phosphorescent materials into a fine dot pattern.

BRIEF SUMMARY OF THE INVENTION

It has been found that the aforementioned problems can be overcome by taking measures that the phosphorescent material is liquefied, that the particle size of coloring pigments and phosphorescent pigments to be mingled in the liquefied phosphorescent material is confined to a predetermined value, and that these coloring pigments and phosphorescent pigments are enabled to be always maintained in a substantially uniform dispersion state in the three-dimensional direction irrespective of when the phosphorescent material is in a liquefied state or in a solid state.

The present invention has been accomplished based on the aforementioned viewpoints, and therefore, the present invention provides a liquefied color phosphorescent material consisting of a mixture which mainly comprises; a stock solution consisting of a thermoplastic resin and an organic solvent; a colorant containing a coloring pigment; a color-emitting phosphorescent fine pigment particle having an average particle diameter of 7 $\mu$m or less; and an additive for stably dispersing pigments containing a cellulose-based synthetic resin, silica-based powder, cyclohexanone, isophorone and mineral spirit.

The color phosphorescent material and the method thereof according to the present invention are featured in that they utilize the effects that the color pigment and the phosphorescent pigment are enabled to be always maintained in a substantially uniform dispersion state in all of the three-dimensional direction irrespective of when the phosphorescent material is in a liquefied state or in a solid state, and hence the present invention quite differs from the conventional idea and technique.

Namely, according to the color phosphorescent material and the manufacturing method of the present invention, the coloring pigment and the phosphorescent pigment are enabled to be always maintained in a substantially uniform diffused and dispersion state in all of the three-dimensional direction, without causing the coloring pigment and the phosphorescent pigment to be settled or to become non-uniform, thereby making it possible to realize a desired phosphorescent color and to delicately control the tone of phosphorescent color. Additionally, the color phosphorescent material and the method thereof according to the present invention are designed such that even if the phosphorescent is coated directly over a colored substrate or a patterned substrate without applying an undercoating using a color paint, it is possible to enhance the phosphorescent color-emitting efficiency and to keep a constant luminous intensity for a longer period of time.

BRIEF DESCRIPTION OF THE SEVERAL VIEWS OF THE DRAWING

FIG. 1 shows a substantially uniform dispersion state of the coloring pigments 1 and phosphorescent pigments 2, namely, they are not settled on the underlying substrate 3;

FIG. 4 shows the condition that phosphorescent pigments 2, 4 and coloring pigment 1 are not settled on the underlying substrate 3 and are maintained in a substantially uniform dispersion state;

DETAILED DESCRIPTION OF THE INVENTION

Next, the principle and method of the present invention as well as specific examples of the present invention will be explained. By the way, it should be noted that these examples are not intended to limit the scope of the present invention, but are set forth simply for the purpose of explaining the present invention.

According to the present invention, the stock solution and the coloring agent (both constituting basic materials) may be selected from those which are commonly employed at present. However, the following components "A" and "B" may be employed as an example and mixed together at the following mixing ratios.

A. Stock solution (varnish)
Thermoplastic synthetic resin (acrylic, cellulose, vinyl or urethane resin): 10–65%
Organic solvent (ketone-based, glycol ether-based, ester-based or aromatic hydrocarbon-based solvent): 10–80%
Silicone-based defoaming agent: 0–10%

B. Colorant
Thermoplastic synthetic resin (acrylic, cellulose, vinyl or urethane resin): 10–60%
Defoaming agent (silicone oil): 0–5%
Organic pigment: 1–20%
Wetting/dispersing agent (polycarboxylic acid, amide-based resin): 1–10%
Organic solvent (ketone-based, ether-based, ester-based or hydrocarbon-based solvent): 10–80%

By the way, when a colorant is not employed (a colorant is not included in the phosphorescent material), the color tone of phosphorescent material can be made colorless and transparent under visual condition in a lightened condition.

The color phosphorescent pigment particle can be manufactured by suitably mixing $Al_2O_3$, $SrO$, $CaO$, $Eu_2O_3$ and $B_2O_3$. The particle size of the pigment is confined to 7 μm or less on average to thereby obtain stabilized fine particles.

The "additive for stably dispersing pigments" according to the present invention can be constituted by the following components which can be mixed at the ratio set forth below.

| | |
|---|---|
| Synthetic resin containing cellulose-based resin | 1–20% |
| Silica-based powder | 1–20% |
| Cyclohexanone | 1–30% |
| Isophorone | 30–70% |
| Mineral spirit | 5–30% |

In the manufacture of the phosphorescent material of the present invention, the above A and B are mixed with a color phosphorescent pigment to form a solution to be employed as a base component.

Then, the aforementioned additive for stably dispersing pigment comprising the aforementioned components and having the aforementioned mixing ratio is mixed with the aforementioned solution. This mixing can be performed by means of mechanical stirring.

Figure 1:
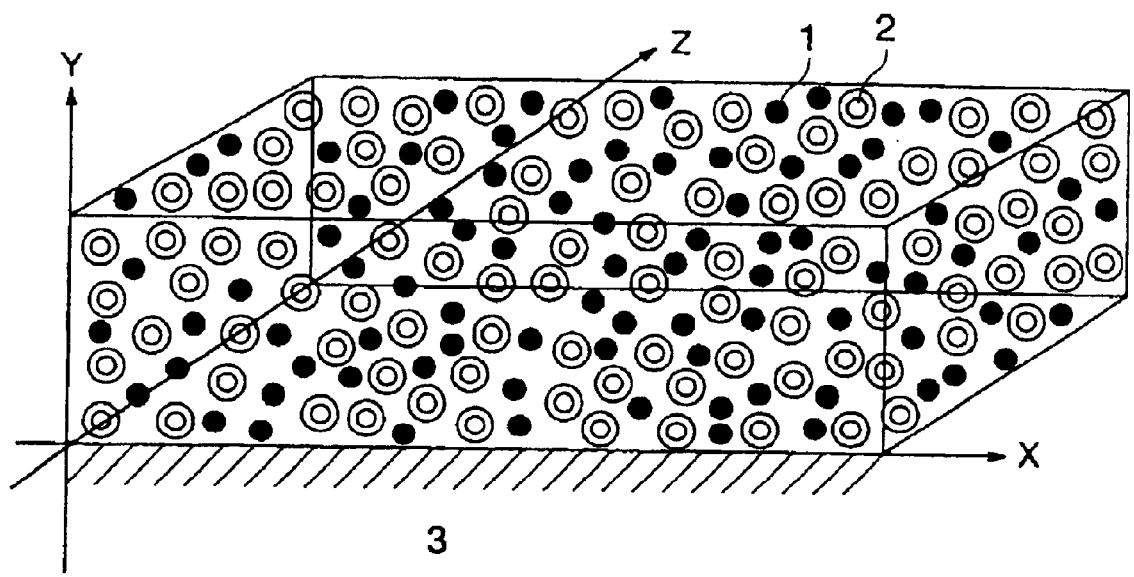
FIG. 1 is a perspective view (stereoscopic view) illustrating a state of a color phosphorescent material according to one example of the present invention.
Figure 2:
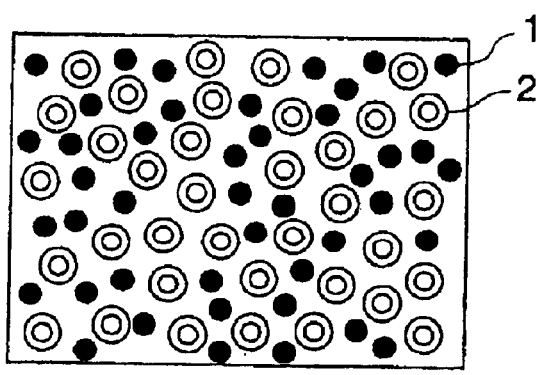
FIG. 2 is a top plan view illustrating a state of a color phosphorescent material according to one example of the present invention (see FIG. 1)
Figure 3:
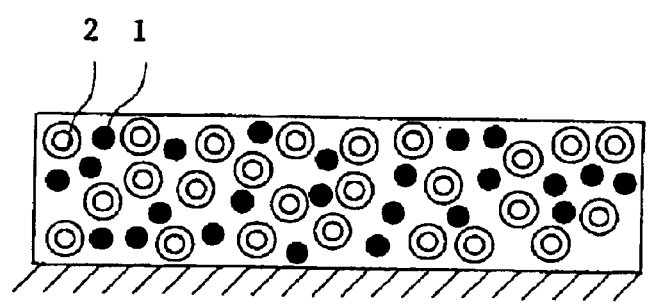
FIG. 3 is a cross-sectional view illustrating a state of a color phosphorescent material according to one example of the present invention (see FIG. 1)

When this additive is mixed with the aforementioned solution, the coloring pigment and color phosphorescent pigment included in the solution are permitted to diffuse and disperse substantially uniformly in three-dimensional direction by the effect of the components contained in the additive as shown in FIGS. 1 to 3.

This effect for uniformly dispersing pigments can be further promoted by the fact that since the color phosphorescent pigment particle is confined in average size to 7 μm or less, the color phosphorescent pigment particle can be kept in a stabilized state. Because, although particles inherently have a nature to attract each other due to the effect of ion (electric attractive force), this attracting nature can be weakened by pulverizing the pigments into stable fine particles.

Once these coloring pigment particles and phosphorescent pigment particles are substantially uniformly diffused or dispersed in the three-dimensional direction in the solution, this dispersed condition can be semi-permanently maintained. Namely, even if the solution is dried into a solid state, this dispersed condition can be maintained.

Further, when these coloring pigment particles and phosphorescent pigment particles are substantially uniformly diffused or dispersed in the three-dimensional direction in the solution, each particle in these coloring pigment and phosphorescent pigment would be enabled to be uniformly and effectively irradiated with light.

Therefore, firstly, it is possible, according to the phosphorescent material of the present invention, to obtain luminescent color which the color phosphorescent pigment inherently has. Because, since the color phosphorescent pigment particles which are higher in specific gravity than that of coloring pigment particles are enabled to be substantially uniformly diffused and dispersed in three-dimensional direction together with the coloring pigment particles in the solution, the color phosphorescent pigment particles are enabled to effectively and sufficiently receive the light (sun light, ultraviolet rays, fluorescent light, incandescent light, high-temperature heat) that causes the emission of light.

As a result, the speed of light-emitting reaction (response speed) of the color phosphorescent pigment particles to the light becomes higher, thereby making it possible to obtain a high-luminance intensity, a high-emission durability and a high-stable emission of light.

Whereas, according to the prior art, due to the fact that the specific gravity of the color phosphorescent pigment particles is higher than that of the coloring pigment particles, the color phosphorescent pigment particles is caused to settle with time, thereby causing the surface of color phosphorescent pigment to be covered by the coloring pigment particles, thus making it impossible to obtain a desired luminescent color.

By the way, according to the prior art, polycarboxylic acid and amide-based additive are employed as an antisettling agent, as a suspension agent or as a dispersing agent. These additives are usually incorporated into a colorant.

Figure 6:
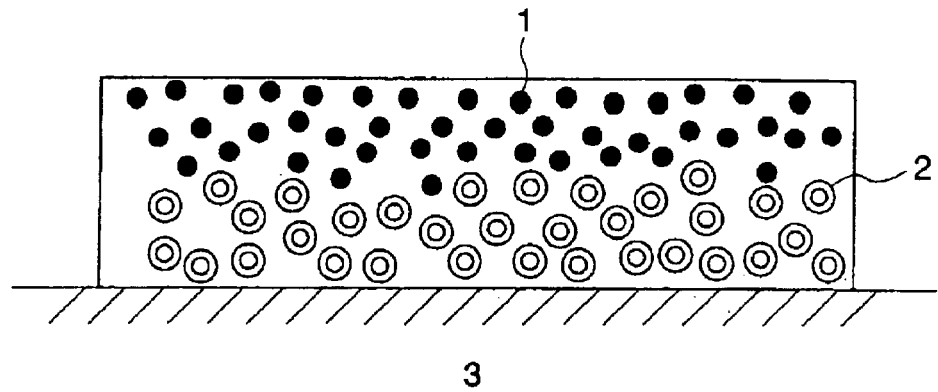
FIG. 6 is a cross-sectional view illustrating a state of coated surface wherein one example of the conventional color phosphorescent material is employed.

However, even if these additives are employed, it is impossible to uniformly diffuse or disperse the coloring pigment particles and the color phosphorescent pigment particles in the solution. Because, since the specific gravity of the particles of coloring pigment and the color phosphorescent pigment differs depending on the kinds thereof, it is impossible for these conventional antisettling agent, suspension agent and dispersing agent to cope with each of different situations. Namely, polycarboxylic acid and amide-based additive are susceptible to the influence of drying speed, and are weakened with time, whereby the particles are brought into a state as shown in FIG. 6.

The prior art is accompanied with specific problems that when these coloring pigment and color phosphorescent pigment are mixed together, the particles are turned into so-called "bulky aggregation" (a state which is similar to a small lump of particles which will be generated as wheat flour is kneaded together with water). As a result, an uneven emission of luminescent color is caused to generate where part of paint is permitted to strongly emit luminescent color but other part of paint is simply permitted to weakly emit luminescent color.

Secondly, according to the phosphorescent material of the present invention where the aforementioned effects are utilized, the color tone to be recognized under visual condition can be made different from the color tone to be emitted in darkness. Since the particles of coloring pigment and color phosphorescent pigment are enabled to be uniformly diffused in three-dimensional direction, the particles are kept at a constant distance away from each other, thereby preventing these particles from being formed into a bulky aggregation. As a result, under a lightened condition, the color tone of pigments which is visual under such a condition can be visually recognized, whereas in the darkness, the luminescent color of the phosphorescent pigment can be visually recognized.

Figure 4:
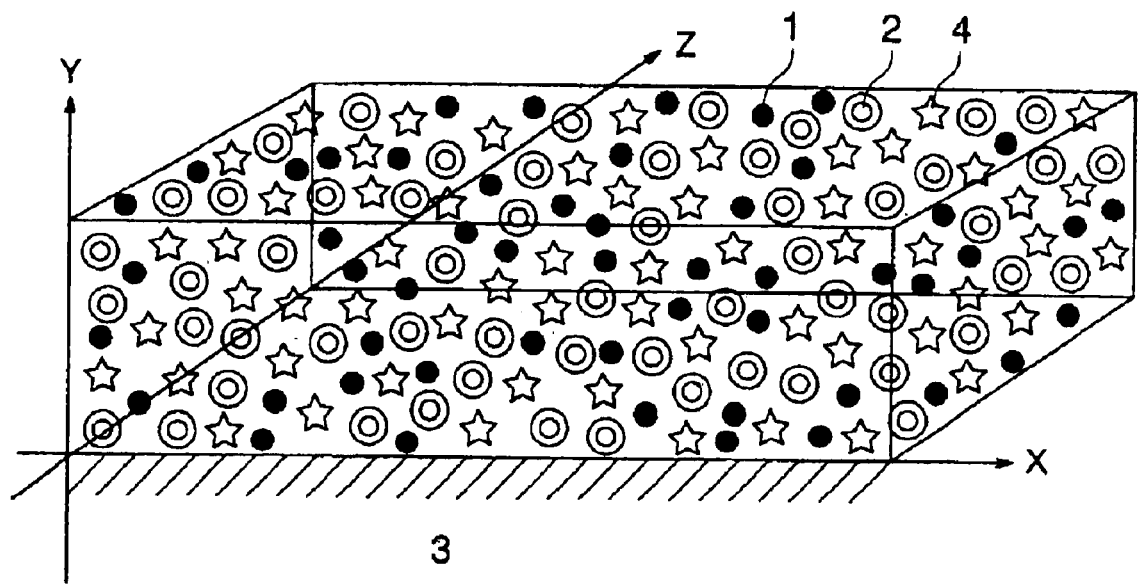
FIG. 4 is a perspective view (stereoscopic view) illustrating the condition of pigment particles when plural kinds of phosphorescent pigments 2, 4 and coloring pigment 1 are mixed together in the color phosphorescent material of the present invention.

Thirdly, according to the phosphorescent material of the present invention, the color tone of luminescent color can be delicately adjusted (adjustment of color). Namely, according to the present invention, even if the color phosphorescent pigment is composed of two or more kinds of pigments differing in specific gravity from each other, these pigments can be enabled to be substantially uniformly diffused in three-dimensional direction without being formed into a bulky aggregation as shown in FIG. 4, the particles of these pigments are enabled to emit individual luminescent color while keeping a constant distance away from each other, even if these different pigments are intermingled with each other.

Figure 7:
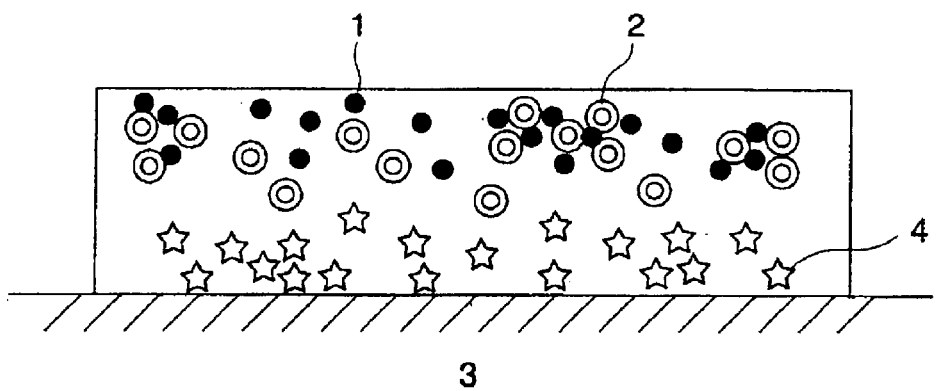
FIG. 7 is a cross-sectional view illustrating the condition of pigment particles when a plural kinds of phosphorescent pigment and coloring pigment are mixed together in the color phosphorescent material of the prior art.
Figure 8:
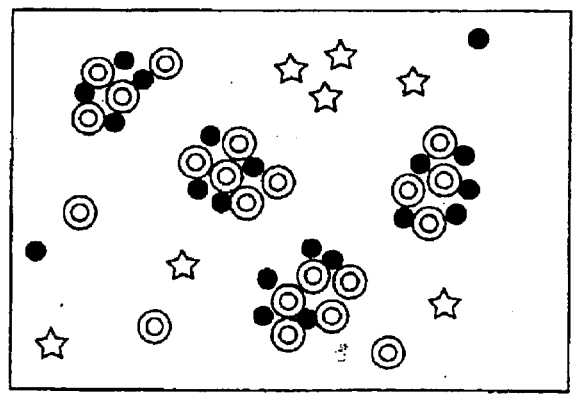
FIG. 8 is a top plan view illustrating the condition of pigment particles when a plural kinds of phosphorescent pigment and coloring pigment are mixed together in the color phosphorescent material of the prior art.

Whereas, in the case of the conventional phosphorescent paint, as shown in FIG. 7 and FIG. 8, due to the generation of sedimentation, coagulation and bulky aggregation of coloring pigments and color phosphorescent pigment due to differences in kinds or features thereof, the adjustment of luminescent color has been very difficult.

This invention will be further explained in detail with reference to the following various examples. By the way, all of "%" and "part(s)" appearing in this specification are based on weight unless otherwise indicated.

EXAMPLE 1

This example is directed to the case where the visual color (the color that can be visually recognized in a lightened condition) is green, and the luminescent color in the darkness is green.

10 to 60% (for example, 30%) of resinous mixture consisting of thermoplastic vinyl resin, thermoplastic acrylic resin and thermoplastic cellulose resin, 10 to 80% (for example, 69.8%) of ketone-based and glycol ether-based solvents, and 0 to 5% (for example, 0.2%) of a silicon-based anti-foaming agent were mixed together to thermally dissolve them, thereby obtaining a varnish as a stock solution.

Then, 10 to 60% (for example, 35%) of this stock solution, 1 to 20% (for example, 10%) of phthalocyanine-based green organic pigment, 1 to 10% (for example, 1.5%) of polycarboxylic acid and amide-based additive (a wetting/dispersing agent for these color phosphorescent pigment and color coloring pigment), 0 to 5% (for example, 0.5%) of a silicon-based anti-foaming agent, and 10 to 80% (for example, 53%) of ketone-based and glycol ether-based organic solvents were mixed together to obtain a mixture, which was then pulverized into not more than 5 micrometers in size by making use of a triple roll mill to obtain a color paste.

Then, 50 parts of the aforementioned stock solution, 50 parts of a green color phosphorescent pigment consisting of a mixture comprising $Al_2O_3$, SrO, CaO, $Eu_2O_3$ and $B_2O_3$ (average particle diameter: 7 μm or less); 1 to 20 parts (for example, 10 parts) of an additive for stably dispersing pigments (i.e. which functions to achieve a uniform diffusion, dispersion of the particles of color phosphorescent pigment and coloring pigment, to improve the fluidity of the particles, to maintain the stability of the particles, and to enhance the workability of phosphorescent material) which is formed of a mixture consisting of 1–20% (for example, 6%) of cellulose-based resin, 1–20% (for example, 6%) of silica-based powder, 1–30% (for example, 15%) of cyclohexanone, 30–70% (for example, 60%) of isophorone, and 5–30% (for example, 13%) of mineral spirit; and 0 to 20 parts (for example, 2 parts) of the aforementioned color paste are mixed together by means of mechanical stirring to uniformly disperse these components to thereby obtain a color phosphorescent stock solution.

By making use of this color phosphorescent stock solution, a printing was performed on a white PVC sticker (Super stick; Lyntech Co., Ltd.) by means of a screen printing method using a 220 mesh polyester screen printing plate.

The printed layer obtained through a hot air-drying treatment under the conditions of 60 degrees centigrade for 10 minutes was found to exhibit a green color under the visual condition. This printed matter was exposed to a 15 W black light for 3 minutes and then, the light was turned OFF. As a result, a clear green luminescent color was recognized. This luminous intensity was found 2.33320 $cd/m^2$ as it was measured using a luminance meter (Bm-5A (visual field: 2 degrees), Topcon Co., Ltd.).

Thereafter, this printed matter was left in the darkness for 4 hours, and then, the luminous intensity was measured again in the same manner as described above. As a result, the luminous intensity was deteriorated down to 0.002 $cd/m^2$, but it was still possible to recognize the luminescence therefrom.

A color phosphorescent stock solution for printing it on a textile was prepared as follows.

First of all, a stock solution was prepared as follows. Namely, 10 to 60% (for example, 30%) of thermoplastic urethane resin, 10 to 80% (for example, 68.5%) of ketone-based and glycol ether-based solvents, and 0 to 5% (for example, 1.5%) of a silicon-based anti-foaming agent were mixed together by means of mechanical stirring to thermally dissolve them, thereby obtaining the stock solution. Then, a color phosphorescent stock solution was prepared by way of the same procedures as mentioned above by making use of this stock solution.

By making use of this color phosphorescent stock solution, a printing was performed on a 100% cotton T-shirt by means of a screen printing method using a 150 mesh polyester screen printing plate.

The printed layer obtained through a hot air-drying treatment under the conditions of 140 degrees centigrade for 90 seconds was found to exhibit a green color under the visual condition. This printed matter was exposed to a 27 W fluorescent lamp for 20 seconds and then, the lamp was turned OFF. As a result, a clear green luminescent color was recognized. This luminous intensity was found 2.05 $cd/m^2$ as it was measured using a luminance meter (BM-8 (visual field: 2 degrees), Topcon Co., Ltd.).

Thereafter, this printed matter was left in the darkness for 2 hours, and then, the luminous intensity was measured again in the same manner as described above. As a result, the luminous intensity was deteriorated down to 0.002 $cd/m^2$, but it was still possible to recognize the luminescence therefrom.

A color phosphorescent stock solution for printing it on an earthenware was prepared as follows.

First of all, a stock solution was prepared as follows. Namely, 10 to 65% (for example, 50%) of a resinous mixture consisting of acrylic resin and thermoplastic urethane resin, 10 to 65% (for example, 49%) of ester-based and aromatic hydrocarbon-based solvents, and 0 to 5% (for example, 1%) of a silicon-based anti-foaming agent were mixed together by means of mechanical stirring to thermally dissolve them, thereby obtaining the stock solution.

Then, 10 to 60% (for example, 44%) of the above stock solution, 1 to 20% (for example, 10%) of a phthalocyanine-based green organic pigment, 1 to 10% (for example, 1.5%) of polycarboxylic acid and amide-based additive, 0 to 5% (for example, 0.5%) of a silicon-based anti-foaming agent, and 10 to 60% (for example, 44%) of ester-based and aromatic hydrocarbon-based organic solvents were mixed together to obtain a mixture, which was then pulverized into not more than 5 micrometers in size by making use of a triple roll mill to obtain a color paste. Then, a color phosphorescent stock solution was prepared by way of the same procedures as mentioned above by making use of this color paste.

By making use of this color phosphorescent stock solution, a printing was performed on a cup made of earthenware by means of a screen printing method using a 120 mesh polyester screen printing plate.

The printed layer obtained through a baking treatment under the conditions of 150 degrees centigrade for 30 minutes was found to exhibit a green color under the visual condition. This printed matter was exposed to a 15 W fluorescent lamp for 3 minutes and then, the lamp was turned OFF. As a result, a clear green luminescent color was recognized.

The phosphorescent material according to Example 1 could be prepared in the ranges described below.

| | |
|---|---:|
| A. Stock solution (varnish) | 50 parts |
| Thermoplastic synthetic resin (acrylic, cellulose, vinyl or urethane resin): 10–65% | |
| Organic solvent (ketone-based, glycol ether-based, ester-based or aromatic hydrocarbon-based solvent): 10–80% | |
| Silicone-based defoaming agent: 0–10% | |
| B. Colorant | 1 to 20 parts |
| Thermoplastic synthetic resin (acrylic, cellulose, vinyl or urethane resin): 10–60% | |
| Defoaming agent (silicone oil): 0–5% | |
| Organic pigment: 1–20% | |
| Wetting/dispersing agent (polycarboxylic acid, amide-based resin): 1–10% | |
| Organic solvent (ketone-based, ether-based, ester-based or hydrocarbon-based solvent): 10–80% | |
| C. Additive for stably dispersing pigments | 1 to 20 parts |
| Cellulose-based synthetic resin: 1–20% | |
| Silica-based powder: 1–20% | |
| Cyclohexanone: 1–30% | |
| Isophorone: 30–70% | |
| Mineral spirit: 5–30% | |
| D. Color phosphorescent pigment emitting green color | 50 parts |
| Inorganic mixture consisting of: $Al_2O_3$, SrO, CaO, $Eu_2O_3$ and $B_2O_3$: 100% | |

EXAMPLE 2

This example is directed to the case where the visual color (the color that can be visually recognized in a lightened condition) is red, and the luminescent color in the darkness is red.

10 to 60% (for example, 30%) of resinous mixture consisting of thermoplastic vinyl resin, thermoplastic acrylic resin and thermoplastic cellulose resin, 10 to 80% (for example, 69.8%) of ketone-based and glycol ether-based solvents, and 0 to 5% (for example, 0.2%) of a silicon-based anti-foaming agent were mixed together to thermally dissolve them, thereby obtaining a varnish as a stock solution.

Then, 10 to 60% (for example, 35%) of this stock solution, 1 to 20% (for example, 10%) of azo-based red organic pigment, 1 to 10% (for example, 1.5%) of polycarboxylic acid and amide-based additive (a wetting/dispersing agent for these color phosphorescent pigment and color coloring pigment), 0 to 5% (for example, 0.5%) of a silicon-based anti-foaming agent, and 10 to 80% (for example, 53%) of ketone-based and glycol ether-based organic solvents were mixed together to obtain a mixture, which was then pulverized into not more than 5 micrometers in size by making use of a triple roll mill to obtain a color paste.

Then, 50 parts of the aforementioned stock solution, 50 parts of a red color phosphorescent pigment consisting of a mixture comprising $Al_2O_3$, SrO, CaO, $Eu_2O_3$ and $B_2O_3$ (average particle diameter: 7 μm or less); 1 to 20 parts (for example, 10 parts) of an additive for stably dispersing pigments (i.e. which functions to achieve a uniform diffusion, dispersion of the particles of color phosphorescent pigment and coloring pigment, to improve the fluidity of the particles, to maintain the stability of the particles, and to enhance the workability of phosphorescent material) which is formed of a mixture consisting of 1–20% (for example, 6%) of cellulose-based resin, 1–20% (for example, 6%) of silica-based powder, 1–30% (for example, 20%) of cyclohexanone, 30–70% (for example, 50%) of isophorone, and 5–30% (for example, 18%) of mineral spirit; and 0 to 20 parts (for example, 1 part) of the aforementioned color paste are mixed together by means of mechanical stirring to uniformly disperse these components to thereby obtain a color phosphorescent stock solution.

By making use of this color phosphorescent stock solution, a printing was performed on a white PVC sticker (Super stick; Lyntech Co., Ltd.) by means of a screen printing method using a 225 mesh polyester screen printing plate.

The printed layer obtained through a hot air-drying treatment under the conditions of 60 degrees centigrade for 10 minutes was found to exhibit a red color under the visual condition. This printed matter was exposed to a 15 W fluorescent lamp for 3 minutes and then, the light was turned OFF. As a result, a clear red luminescent color was recognized. This luminous intensity was found 0.990 $cd/m^2$ as it was measured using a luminance meter (Bm-5A (visual field: 2 degrees), Topcon Co., Ltd.).

Thereafter, this printed matter was left in the darkness for 2 hours, and then, the luminous intensity was measured again in the same manner as described above. As a result, the luminous intensity was deteriorated down to 0.00054 $cd/m^2$, but it was still possible to recognize the luminescence therefrom.

A color phosphorescent stock solution for printing it on a textile was prepared as follows.

First of all, a stock solution was prepared as follows. Namely, 10 to 60% (for example, 30%) of thermoplastic urethane resin, 10 to 80% (for example, 68.5%) of ketone-based and glycol ether-based solvents, and 0 to 5% (for example, 1.5%) of a silicon-based anti-foaming agent were mixed together by means of mechanical stirring to thermally dissolve them, thereby obtaining the stock solution. Then, a color phosphorescent stock solution was prepared by way of the same procedures as mentioned above by making use of this stock solution.

By making use of this color phosphorescent stock solution, a printing was performed on a 100% cotton T-shirt by means of a screen printing method using a 150 mesh polyester screen printing plate.

The printed layer obtained through a hot air-drying treatment under the conditions of 140 degrees centigrade for 90 seconds was found to exhibit a red color under the visual condition. This printed matter was exposed to a 27 W fluorescent lamp for 20 seconds and then, the lamp was turned OFF. As a result, a clear red luminescent color was recognized. This luminous intensity was found 0.75 cd/m$^2$ as it was measured using a luminance meter (BM-8 (visual field: 2 degrees), Topcon Co., Ltd.).

Thereafter, this printed matter was left in the darkness for 2 hours, and then, the luminous intensity was measured again in the same manner as described above. As a result, the luminous intensity was deteriorated down to 0.001 cd/m$^2$, but it was still possible to recognize the luminescence therefrom.

A color phosphorescent stock solution for printing it on an earthenware was prepared as follows.

First of all, a stock solution was prepared as follows. Namely, 10 to 65% (for example, 50%) of a resinous mixture consisting of acrylic resin and thermoplastic urethane resin, 10 to 65% (for example, 49%) of ester-based and aromatic hydrocarbon-based solvents, and 0 to 5% (for example, 1%) of a silicon-based anti-foaming agent were mixed together by means of mechanical stirring to thermally dissolve them, thereby obtaining the stock solution.

Then, 10 to 60% (for example, 44%) of the above stock solution, 1 to 20% (for example, 10%) of an azo-based red organic pigment, 1 to 10% (for example, 1.5%) of polycarboxylic acid and amide-based additive, 0 to 5% (for example, 0.5%) of a silicon-based anti-foaming agent, and 10 to 60% (for example, 44%) of ester-based and aromatic hydrocarbon-based organic solvents were mixed together to obtain a mixture, which was then pulverized into not more than 5 micrometers in size by making use of a triple roll mill to obtain a color paste. Then, a color phosphorescent stock solution was prepared by way of the same procedures as mentioned above by making use of this color paste.

By making use of this color phosphorescent stock solution, a printing was performed on a cup made of earthenware by means of a screen printing method using a 120 mesh polyester screen printing plate.

The printed layer obtained through a baking treatment under the conditions of 150 degrees centigrade for 30 minutes was found to exhibit a red color under the visual condition. This printed matter was exposed to a 15 W fluorescent lamp for 3 minutes and then, the lamp was turned OFF. As a result, a clear red luminescent color was recognized.

The phosphorescent material according to Example 2 could be prepared in the renages described below.

| | |
|---|---|
| A. Stock solution (varnish) | 50 parts |
| Thermoplastic synthetic resin (acrylic, cellulose, vinyl or urethane resin): 10–65% | |
| Organic solvent (ketone-based, glycol ether-based, ester-based or aromatic hydrocarbon-based solvent): 10–80% | |
| Silicone-based defoaming agent: 0–10% | |
| B. Colorant | 1 to 20 parts |
| Thermoplastic synthetic resin (acrylic, cellulose, vinyl or urethane resin): 10–60% | |
| Defoaming agent (silicone oil): 0–5% | |
| Organic pigment: 1–20% | |
| Wetting/dispersing agent (polycarboxylic acid, amide-based resin): 1–10% | |
| Organic solvent (ketone-based, ether-based, ester-based or hydrocarbon-based solvent): 10–80% | |
| C. Additive for stably dispersing pigments | 1 to 20 parts |
| Cellulose-based synthetic resin: 1–20% | |
| Silica-based powder: 1–20% | |
| Cyclohexanone: 1–30% | |
| Isophorone: 30–70% | |
| Mineral spirit: 5–30% | |
| D. Color phosphorescent pigment emitting red color | 50 parts |
| Inorganic mixture consisting of: Al$_2$O$_3$, SrO, CaO, Eu$_2$O$_3$ and B$_2$O$_3$: 100% | |

EXAMPLE 3

This example is directed to the case where the visual color (the color that can be visually recognized in a lightened condition) is red, and the luminescent color in the darkness is purple. 10 to 60% (for example, 30%) of resinous mixture consisting of thermoplastic vinyl resin, thermoplastic acrylic resin and thermoplastic cellulose resin, 10 to 80% (for example, 69.8%) of ketone-based and glycol ether-based solvents, and 0 to 5% (for example, 0.2%) of a silicon-based anti-foaming agent were mixed together to thermally dissolve them, thereby obtaining a varnish as a stock solution.

Then, 10 to 60% (for example, 35%) of this stock solution, 1 to 20% (for example, 10%) of azo-based red organic pigment, 1 to 10% (for example, 1.5%) of polycarboxylic acid and amide-based additive (a wetting/dispersing agent for these color phosphorescent pigment and color coloring pigment), 0 to 5% (for example, 0.5%) of a silicon-based anti-foaming agent, and 10 to 80% (for example, 53%) of ketone-based and glycol ether-based organic solvents were mixed together to obtain a mixture, which was then pulverized into not more than 5 micrometers in size by making use of a triple roll mill to obtain a color paste.

Then, 50 parts of the aforementioned stock solution, 0 to 49 parts (for example, 10 parts) of a red color phosphorescent pigment consisting of an inorganic mixture comprising Al$_2$O$_3$, CaO, Eu$_2$O$_3$ and B$_2$O$_3$ (average particle diameter: 7 µm or less); 0 to 49 parts (for example, 40 parts) of a blue color phosphorescent pigment consisting of an inorganic mixture comprising Al$_2$O$_3$, SrO, CaO, Eu$_2$O$_3$ and B$_2$O$_3$ (average particle diameter: 7 µm or less); 1 to 20 parts (for example, 10 parts) of an additive for stably dispersing pigments (i.e. which functions to achieve a uniform diffusion, dispersion of the particles of color phosphorescent pigment and coloring pigment, to improve the fluidity of the particles, to maintain the stability of the particles, and to enhance the workability of phosphorescent material) which is formed of a mixture consisting of 1–20% (for example, 6%) of cellulose-based resin, 1–20% (for example, 6%) of silica-based powder, 1–30% (for example, 25%) of cyclohexanone, 30–70% (for example, 43%) of isophorone, and 5–30% (for example, 20%) of mineral spirit; and 0 to 20 parts (for example, 1 part) of the aforementioned color paste are mixed together by means of mechanical stirring to uniformly disperse these components to thereby obtain a color phosphorescent stock solution.

By making use of this color phosphorescent stock solution, a printing was performed on a white PVC sticker (Super stick; Lyntech Co., Ltd.) by means of a screen printing method using a 225 mesh polyester screen printing plate.

The printed layer obtained through a hot air-drying treatment under the conditions of 60 degrees centigrade for 10 minutes was found to exhibit a red color under the visual condition. This printed matter was exposed to a 15 W fluorescent lamp for 3 minutes and then, the light was turned OFF. As a result, a clear purple luminescent color was recognized.

A color phosphorescent stock solution for printing it on a textile was prepared as follows.

First of all, a stock solution was prepared as follows. Namely, 10 to 60% (for example, 30%) of thermoplastic urethane resin, 10 to 80% (for example, 68.5%) of ketone-based and glycol ether-based solvents, and 0 to 5% (for example, 1.5%) of a silicon-based anti-foaming agent were mixed together by means of mechanical stirring to thermally dissolve them, thereby obtaining the stock solution. Then, a color phosphorescent stock solution was prepared by way of the same procedures as mentioned above by making use of this stock solution.

By making use of this color phosphorescent stock solution, a printing was performed on a 100% cotton T-shirt by means of a screen printing method using a 150 mesh polyester screen printing plate.

The printed layer obtained through a hot air-drying treatment under the conditions of 140 degrees centigrade for 90 seconds was found to exhibit a red color under the visual condition. This printed matter was exposed to a 15 W fluorescent lamp for 3 minutes and then, the lamp was turned OFF. As a result, a clear purple luminescent color was recognized.

A color phosphorescent stock solution for printing it on an earthenware was prepared as follows.

First of all, a stock solution was prepared as follows. Namely, 10 to 65% (for example, 50%) of a resinous mixture consisting of acrylic resin and thermoplastic urethane resin, 10 to 65% (for example, 49%) of ester-based and aromatic hydrocarbon-based solvents, and 0 to 5% (for example, 1%) of a silicon-based anti-foaming agent were mixed together by means of mechanical stirring to thermally dissolve them, thereby obtaining the stock solution.

Then, 10 to 60% (for example, 44%) of the above stock solution, 1 to 20% (for example, 10%) of an azo-based red organic pigment, 1 to 10% (for example, 1.5%) of polycarboxylic acid and amide-based additive, 0 to 5% (for example, 0.5%) of a silicon-based anti-foaming agent, and 10 to 60% (for example, 44%) of ester-based and aromatic hydrocarbon-based organic solvents were mixed together to obtain a mixture, which was then pulverized into not more than 5 micrometers in size by making use of a triple roll mill to obtain a color paste. Then, a color phosphorescent stock solution was prepared by way of the same procedures as mentioned above by making use of this color paste.

By making use of this color phosphorescent stock solution, a printing was performed on a cup made of earthenware by means of a screen printing method using a 120 mesh polyester screen printing plate.

The printed layer obtained through a baking treatment under the conditions of 150 degrees centigrade for 30 minutes was found to exhibit a red color under the visual condition. This printed matter was exposed to a 15 W fluorescent lamp for 3 minutes and then, the lamp was turned OFF. As a result, a clear purple luminescent color was recognized.

The phosphorescent material according to Example 3 could be prepared in the ranges described below.

| | |
|---|---|
| A. Stock solution (varnish)<br>Thermoplastic synthetic resin (acrylic, cellulose, vinyl or urethane resin): 10–65%<br>Organic solvent (ketone-based, glycol ether-based, ester-based or aromatic hydrocarbon-based solvent): 10–80%<br>Silicone-based defoaming agent: 0–10% | 50 parts |
| B. Colorant<br>Thermoplastic synthetic resin (acrylic, cellulose, vinyl or urethane resin): 10–60%<br>Defoaming agent (silicone oil): 0–5%<br>Organic pigment: 1–20%<br>Wetting/dispersing agent (polycarboxylic acid, amide-based resin): 1–10%<br>Organic solvent (ketone-based, ether-based, ester-based or hydrocarbon-based solvent): 10–80% | 1 to 20 parts |
| C. Additive for stably dispersing pigments<br>Cellulose-based synthetic resin: 1–20%<br>Silica-based powder: 1–20%<br>Cyclohexanone: 1–30%<br>Isophorone: 30–70%<br>Mineral spirit: 5–30% | 1 to 20 parts |
| D. Color phosphorescent pigment emitting red color<br>Inorganic mixture consisting of: $Al_2O_3$, SrO, CaO, $Eu_2O_3$ and $B_2O_3$: 100%<br>Color phosphorescent pigment emitting blue color<br>Inorganic mixture consisting of: $Al_2O_3$, SrO, CaO, $Eu_2O_3$ and $B_2O_3$: 100% | 5–49 parts<br><br>5–49 parts |

EXAMPLE 4

This example is directed to the case where the visual color (the color that can be visually recognized in a lightened condition) is blue, and the luminescent color in the darkness is orange. 10 to 60% (for example, 30%) of resinous mixture consisting of thermoplastic vinyl resin, thermoplastic acrylic resin and thermoplastic cellulose resin, 10 to 80% (for example, 69.8%) of ketone-based and glycol ether-based solvents, and 0 to 5% (for example, 0.2%) of a silicon-based anti-foaming agent were mixed together to thermally dissolve them, thereby obtaining a varnish as a stock solution.

Then, 10 to 60% (for example, 35%) of this stock solution, 1 to 20% (for example, 10%) of azo-based red organic pigment, 1 to 10% (for example, 1.5%) of polycarboxylic acid and amide-based additive (a wetting/dispersing agent for these color phosphorescent pigment and color coloring pigment), 0 to 5% (for example, 0.5%) of a silicon-based anti-foaming agent, and 10 to 80% (for example, 53%) of ketone-based and glycol ether-based organic solvents were mixed together to obtain a mixture, which was then pulverized into not more than 5 micrometers in size by making use of a triple roll mill to obtain a color paste.

Then, 50 parts of the aforementioned stock solution, 1 to 49 parts (for example, 10 parts) of a red color phosphorescent pigment consisting of an inorganic mixture comprising $Al_2O_3$, SrO, CaO, $Eu_2O_3$ and $B_2O_3$ (average particle diameter: 7 μm or less); 1 to 49 parts (for example, 10 parts) of a green color phosphorescent pigment consisting of an inorganic mixture comprising $Al_2O_3$, SrO, CaO, $Eu_2O_3$ and $B_2O_3$ (average particle diameter: 7 μm or less); 1 to 20 parts (for example, 10 parts) of an additive for stably dispersing pigments (i.e. which functions to achieve a uniform diffusion, dispersion of the particles of color phosphorescent pigment and coloring pigment, to improve the fluidity of the particles, to maintain the stability of the particles, and to enhance the workability of phosphorescent material) which is formed of a mixture consisting of 1–20% (for example, 6%) of cellulose-based resin, 1–20% (for example, 6%) of silica-based powder, 1–30% (for example, 25%) of cyclohexanone, 30–70% (for example, 43%) of isophorone, and 5–30% (for example, 20%) of mineral spirit; and 0 to 20 parts of the aforementioned color paste are mixed together by means of mechanical stirring to uniformly disperse these components to thereby obtain a color phosphorescent stock solution.

By making use of this color phosphorescent stock solution, a printing was performed on a white PVC sticker (Super stick; Lyntech Co., Ltd.) by means of a screen printing method using a 225 mesh polyester screen printing plate.

The printed layer obtained through a hot air-drying treatment under the conditions of 60 degrees centigrade for 10 minutes was found to exhibit a blue color under the visual condition. This printed matter was exposed to a 15 W fluorescent lamp for 3 minutes and then, the light was turned OFF. As a result, a clear orange luminescent color was recognized.

When printings were performed on a textile and on an earthenware by making use of this color phosphorescent stock solution, almost the same effects as explained Example 3 could be obtained.

The phosphorescent material according to Example 4 could be prepared in the ranges described below.

| | |
|---|---|
| A. Stock solution (varnish)<br>Thermoplastic synthetic resin (acrylic, cellulose, vinyl or urethane resin): 10–65%<br>Organic solvent (ketone-based, glycol ether-based, ester-based or aromatic hydrocarbon-based solvent): 10–80%<br>Silicone-based defoaming agent: 0–10% | 50 parts |
| B. Colorant<br>Thermoplastic synthetic resin (acrylic, cellulose, vinyl or urethane resin): 10–60%<br>Silicone-based defoaming agent: 0–5%<br>Organic pigment: 1–20%<br>Wetting/dispersing agent (polycarboxylic acid, amide-based resin): 1–10%<br>Organic solvent (ketone-based, ether-based, ester-based or hydrocarbon-based solvent): 10–80% | 0 to 20 parts |
| C. Additive for stably dispersing pigments<br>Cellulose-based synthetic resin: 1–20%<br>Silica-based powder: 1–20%<br>Cyclohexanone: 1–30%<br>Isophorone: 30–70%<br>Mineral spirit: 5–30% | 1 to 20 parts |
| D. Color phosphorescent pigment emitting red color<br>Inorganic mixture consisting of: $Al_2O_3$, SrO, CaO, $Eu_2O_3$ and $B_2O_3$: 100%<br>Color phosphorescent pigment emitting green color<br>Inorganic mixture consisting of: $Al_2O_3$, SrO, CaO, $Eu_2O_3$ and $B_2O_3$: 100% | 5–49 parts<br><br>5–49 parts |

EXAMPLE 5

This example is directed to the case where the visual color (the color that can be visually recognized in a lightened condition) is white, and the luminescent color in the darkness is white.

5 to 50% (for example, 20%) of resinous mixture consisting of thermoplastic vinyl resin and thermoplastic cellulose resin, 5 to 70% (for example, 44.8%) of ketone-based and glycol ether-based solvents, and 0 to 5% (for example, 0.2%) of a silicon-based anti-foaming agent were mixed together to thermally dissolve them, thereby obtaining a mixed solution. Thereafter, 10 to 60% of titanium oxide-based inorganic pigment was added to the mixed solution and mechanically dispersed by making use of a triple roll mill to obtain a white stock solution.

Then, 60 parts of this white stock solution, 5 to 30 parts (br example, 11 parts) of a red color phosphorescent pigment consisting of an inorganic mixture comprising $Al_2O_3$, SrO, CaO, $Eu_2O_3$ and $B_2O_3$ (average particle diameter: 7 μm or less); 5 to 30 parts (for example, 18 parts) of a green color phosphorescent pigment consisting of an inorganic mixture comprising $Al_2O_3$, SrO, CaO, $Eu_2O_3$ and $B_2O_3$ (average particle diameter: 7 μm or less); 5 to 30 parts (for example, 11 parts) of a blue color phosphorescent pigment consisting of an inorganic mixture comprising $Al_2O_3$, SrO, CaO, $Eu_2O_3$ and $B_2O_3$ (average particle diameter: 7 μm or less); 1 to 20 parts (for example, 10 parts) of an additive for stably dispersing pigments (i.e. which functions to achieve a uniform diffusion, dispersion of the particles of color phosphorescent pigment and coloring pigment, to improve the fluidity of the particles, to maintain the stability of the particles, and to enhance the workability of phosphorescent material) which is formed of a mixture consisting of 5–50% (for example, 35%) of cellulose-based and vinyl-based resins, 1–20% (for example, 12%) of silica-based powder, 1–30% (for example, 15%) of cyclohexanone, 30–70% (for example, 55%) of isophorone, and 5–30% (for example, 18%) of mineral spirit; and 1 to 20 parts of a ketone-based organic solvent are mixed together by means of mechanical stirring to uniformly disperse these components to thereby obtain a color phosphorescent stock solution.

By making use of this color phosphorescent stock solution, a printing was performed on a white PVC sticker (Super stick; Lyntech Co., Ltd.) by means of a screen printing method using a 225 mesh polyester screen printing plate.

The printed layer obtained through a hot air-drying treatment under the conditions of 60 degrees centigrade for 10 minutes was found to exhibit a white color under the visual condition. This printed matter was exposed to a 15 W fluorescent lamp for 3 minutes and then, the light was turned OFF. As a result, a clear white luminescent color was recognized.

By the way, when less than one part of cellulose-based and vinyl-based blue solution was further added to the above white stock solution, the color tone of the printed layer was found more clear in white color under the visual condition.

When printings were performed on a textile and on an earthenware by making use of this color phosphorescent stock solution of Example 5 in the same manner as the previous Example, almost the same effects as explained the previous Examples could be obtained.

Namely, by making use of this color phosphorescent stock solution, a printing was performed in the same manner as described above on a 100% cotton T-shirt (which was available in the market) by means of a screen printing method using a 150 mesh polyester screen printing plate. As a result, the printed layer obtained through a hot air-drying treatment under the conditions of 140 degrees centigrade for 90 seconds was found to exhibit a white color under the visual condition. This printed matter was then exposed to a 27 W fluorescent lamp for 20 seconds and then, the lamp was turned OFF. As a result, a clear white luminescent color was recognized. This luminous intensity was found 1.03 $cd/m^2$ as it was measured using a luminance meter (BM-8, Topcon Co., Ltd.). Thereafter, this printed matter was left in the darkness for 2 hours, and then, the luminous intensity was measured again in the same manner as described above. As a result, the luminous intensity was deteriorated down to 0.0015 cd/m², but it was still possible to recognize the luminescence therefrom.

The phosphorescent material according to Example 5 could be prepared in the ranges described below.

| | |
|---|---:|
| A. White stock solution (varnish)<br>  Thermoplastic synthetic resin (acrylic, cellulose, vinyl<br>  or urethane resin): 5–50%<br>  Organic solvent (ketone-based, glycol ether-based,<br>  ester-based or aromatic hydrocarbon-based solvent):<br>  5–70%<br>  Silicone-based defoaming agent: 0–5%<br>  Titanium oxide-based organic solvent: 10–60%<br>  (Cellulose-based and vinyl-based blue solution:<br>  less than 1 part) | 60 parts |
| B. Additive for stably dispersing pigments<br>  Cellulose- and vinyl-based synthetic resins: 1–20%<br>  Silica-based powder: 1–20%<br>  Cyclohexanone: 1–30%<br>  Isophorone: 30–70%<br>  Mineral spirit: 5–30% | 1 to 20 parts |
| C. Ketone-based organic solvent<br>  Ketone-based organic solvent: 100% | 1 to 20 parts |
| D. Color phosphorescent pigment emitting red color<br>  Inorganic mixture consisting of: $Al_2O_3$, SrO, CaO,<br>  $Eu_2O_3$ and $B_2O_3$: 100% | 5–30 parts |
|   Color phosphorescent pigment emitting green color<br>  Inorganic mixture consisting of: $Al_2O_3$, SrO, CaO,<br>  $Eu_2O_3$ and $B_2O_3$: 100% | 5–30 parts |
|   Color phosphorescent pigment emitting blue color<br>  Inorganic mixture consisting of: $Al_2O_3$, SrO, CaO,<br>  $Eu_2O_3$ and $B_2O_3$: 100% | 5–30 parts |

As apparent from these examples, it is possible according to the present invention to meet various demands for various luminescent colors as required.

According to the present invention, the weight of the phosphorescent agent in any of the above examples can be increased so as to enhance the luminous intensity.

In contrast to the present invention, the phosphorescent paint according to the prior art has been simply capable of emitting only light green color irrespective of kinds of color pigments.

Further, the phosphorescent paint according to the prior art is incapable of enhancing the luminous intensity even if the weight of the phosphorescent agent is increased. Because, according to the prior art, as the weight of the phosphorescent agent is increased, the specific gravity thereof is correspondingly increased, thereby increasing the ratio of the phosphorescent agent settling down to the underlying substrate.

As apparent from the above explanation, according to the phosphorescent color paint of the present invention, it is no longer necessary to distinguish the color pigment portion from the phosphorescent pigment portion or to apply a primary coating of white paint for the purpose of enhancing the luminous intensity of phosphorescent agent which are considered necessary in the prior art. Namely, according to the phosphorescent color paint of the present invention, it is possible to enable the color or pattern of the underlying layer to become visible in a lightened condition, and to also enable the coated surface of article to emit a desired color of phosphorescent pigment contained in the phosphorescent color paint in the darkness (it is also possible to delicately adjust the color tone). Additionally, it is possible to enable the phosphorescent material to emit a color in the darkness which differs from the color of the phosphorescent material which is visible in a lightened condition.

Accordingly, in contrast to the conventional phosphorescent material whose luminescent color is extremely limited as mentioned above, there is substantially no limitation with regard to the kinds of luminescent color according to the phosphorescent color paint of the present invention, so that the phosphorescent color paint of the present invention is applicable not only to practical goods such as road signs but also to various goods including fashion goods.

Moreover, since thinner is not employed in the phosphorescent material of the present invention, it is applicable not only to a plastic chip, textile goods, etc., but also to other various kinds of goods including fibrous goods such as clothes; leather goods such as bags and shoes; and paper goods such as packaging paper and fan. Further, any special machine would not be necessitated in coating the phosphorescent material of the present invention.

Figure 5:
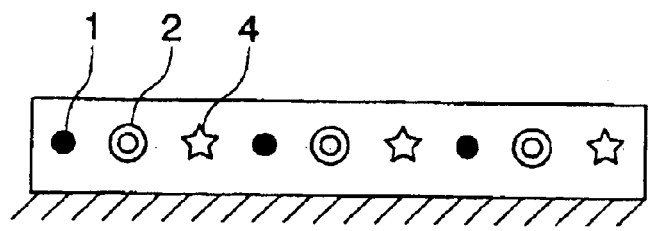
FIG. 5 is a cross-sectional view illustrating a state of a color phosphorescent material of the present invention wherein the color phosphorescent material is formed into a thin layer.

Additionally, since the particles of the coloring pigment and of the color phosphorescent pigment are enabled to be maintained in a uniformly and three-dimensionally diffused or dispersed state in a solution, and also the particle size thereof is confined to a predetermined value so as to stabilize the particles, the color paint is no longer required to be coated thickly. Moreover, since the phosphorescent material of the present invention can be coated to a very thin layer, as shown FIG. 5, it can be employed for forming a fine dot pattern. Namely, it becomes possible to utilize the phosphorescent material for the formation of fine pattern of seal, etc.

Namely, since the phosphorescent color paint of the present invention can be easily coated on any kinds of goods and the resultant surface thus coated can be made smooth, the end-use as well as the fields of utilization thereof can be extremely expanded, thus making it possible to respond to versatile demands.

What is claimed is:

1. A liquid color phosphorescent material including a mixture which comprises:

a stock solution consisting of thermoplastic resin and an organic solvent;

a colorant containing a coloring pigment;

a color-emitting phosphorescent fine pigment particle having an average particle diameter of 7 μm or less; and an additive for stably dispersing pigments containing a cellulose-based synthetic resin, silica-based powder, cyclohexanone, isophorone and mineral spirit;

wherein pigment particles of said colorant and said color-emitting phosphorescent fine pigment particle are enabled to be always maintained in a substantially uniform dispersion stage in all of the three-dimensional direction irrespective of when the phosphorescent material is in a liquefied state, in a transition period from a liquid state to a solid state, or in a solid state.

2. A liquid color phosphorescent material including a mixture which comprises;

a stock solution consisting of a thermoplastic resin and an organic solvent;

a color-emitting phosphorescent fine pigment particle having an average particle diameter of 7 μm or less; and an additive for stably dispersing pigments containing cellulose-based synthetic resin, silica-based powder, cyclohexanone, isophorone and mineral spirit;

wherein pigment particles of said colorant and said color-emitting phosphorescent fine pigment particle are enabled to be always maintained in a substantially uniform dispersion stage in all of the three-dimensional direction irrespective of when the phosphorescent material is in a liquefied state, in a transition period from a liquid state to a solid state, or in a solid state.

3. The color phosphorescent material according to claim 1, wherein said additive for stably dispersing pigments contains 1 to 20% of cellulose-based synthetic resin, 1 to 20% of silica-based powder, 1 to 30% of cyclohexanone, 30 to 70% of isophorone and 5 to 30% of mineral spirit.

4. The color phosphorescent material according to claim 2, wherein said additive for stably dispersing pigments contains 1 to 20% of cellulose-based synthetic resin, 1 to 20% of silica-based powder, 1 to 30% of cyclohexanone, 30 to 70% of isophorone and 5 to 30% of mineral spirit.

5. The color phosphorescent material according to claim 1, wherein said color-emitting phosphorescent fine pigment particle having an average particle diameter of 7 $\mu$m or less is formed of a mixture of two or more kinds thereof.

6. The color phosphorescent material according to claim 2, wherein said color-emitting phosphorescent fine pigment particle having an average particle diameter of 7 $\mu$m or less is formed of a mixture of two or more kinds thereof.

7. The color phosphorescent material according to claim 5, wherein said color-emitting phosphorescent fine pigment particle is formed of 5 to 30 parts of red color-emitting phosphorescent fine pigment; 5 to 30 parts of green color-emitting phosphorescent fine pigment; and 5 to 30 parts of blue color-emitting phosphorescent fine pigment.

8. The color phosphorescent material according to claim 6, wherein said color-emitting phosphorescent fine pigment particle is formed of 5 to 30 parts of red color-emitting phosphorescent fine pigment; 5 to 30 parts of green color-emitting phosphorescent fine pigment; and 5 to 30 parts of blue color-emitting phosphorescent fine pigment.

9. The color phosphorescent material according to claim 7, which further comprises one part or less of cellulose-based or vinyl-based blue color solution.

10. The color phosphorescent material according to claim 8, which further comprises one part or less of cellulose-based or vinyl-based blue color solution.

11. A method of manufacturing a liquefied color phosphorescent material, which comprises a step of;
mixing a stock solution consisting of thermoplastic resin and an organic solvent with a color-emitting phosphorescent fine pigment particle having an average particle diameter of 7 $\mu$m or less, and with an additive for stably dispersing pigments containing a cellulose-based synthetic resin, silica-based powder, cyclohexanone, isophorone and mineral spirit, thereby enabling said color-emitting phosphorescent fine pigment particle to be always maintained in a substantially uniform dispersion state in all of the three-dimensional direction irrespective of when the phosphorescent material is in a liquefied state, in a transition period from a liquid state to a solid state, or in a solid state.

12. The method of manufacturing a liquefied color phosphorescent material according to claim 11, wherein said additive for stably dispersing pigments contains 1 to 20% of cellulose-based synthetic resin, 1 to 20% of silica-based powder, 1 to 30% of cyclohexanone, 30 to 70% of isophorone and 5 to 30% of mineral spirit.

13. The method of manufacturing a liquefied color phosphorescent material according to claim 11, wherein said color-emitting phosphorescent fine pigment particle having an average particle diameter of 7 $\mu$m or less is formed of a mixture of two or more kinds thereof.

14. The method of manufacturing a liquefied color phosphorescent material according to claim 11, wherein said color-emitting phosphorescent fine pigment particle is formed of 5 to 30 parts of red color-emitting phosphorescent fine pigment; 5 to 30 parts of green color-emitting phosphorescent fine pigment; and 5 to 30 parts of blue color-emitting phosphorescent fine pigment.

15. The method of manufacturing a liquefied color phosphorescent material according to claim 11, which further comprises one part or less of cellulose-based or vinyl-based blue color solution.

* * * * *